Feb. 7, 1967   W. S. CASTLE   3,302,924
DUAL AIRFOIL BLADED ROTOR
Filed March 12, 1965   2 Sheets-Sheet 2

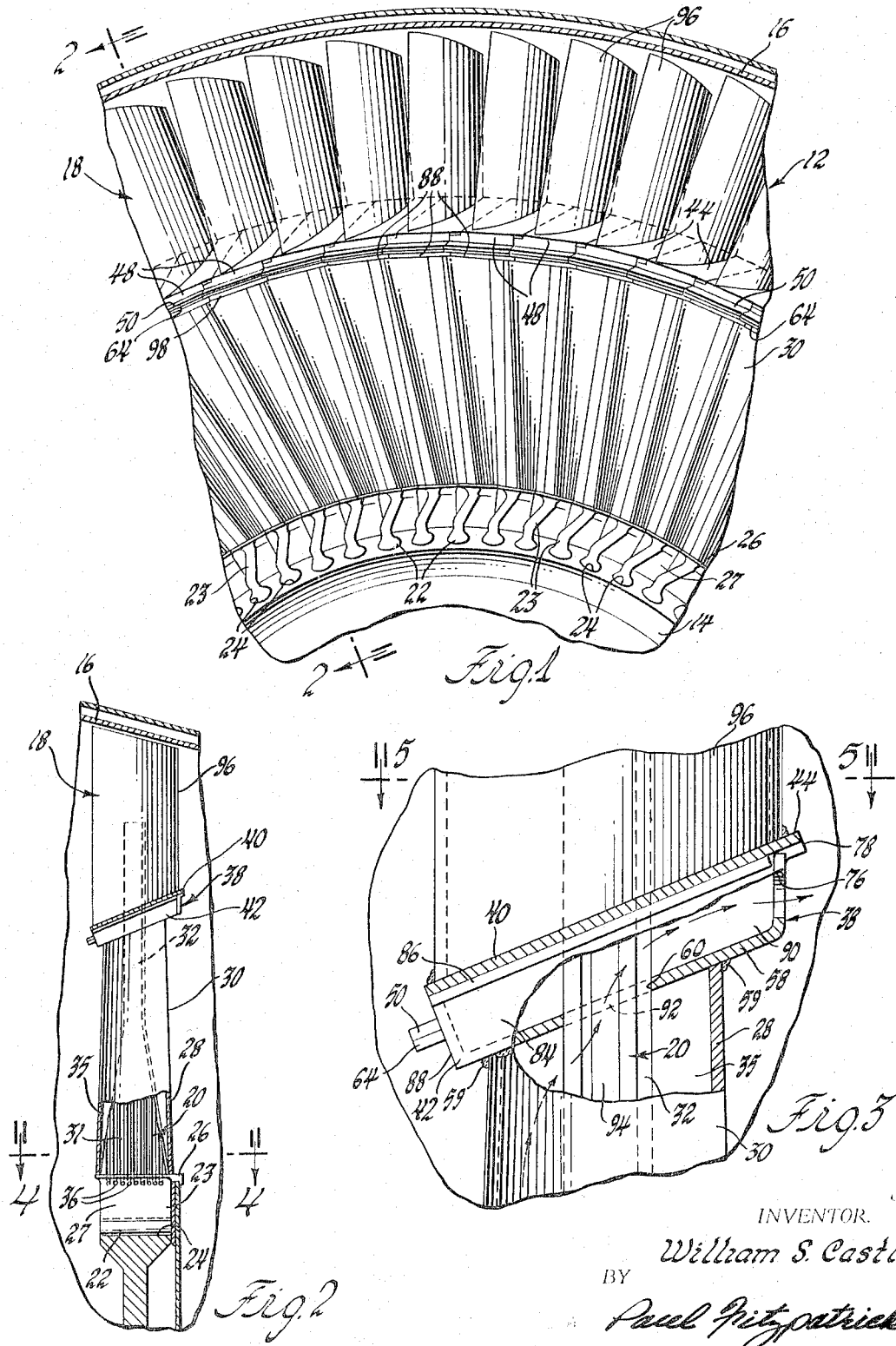

INVENTOR.
William S. Castle
BY Paul Fitzpatrick
ATTORNEY

United States Patent Office 3,302,924
Patented Feb. 7, 1967

3,302,924
DUAL AIRFOIL BLADED ROTOR
William S. Castle, Indianapolis, Ind., assignor to General Motors Corporation, Detroit, Mich., a corporation of Delaware
Filed Mar. 12, 1965, Ser. No. 439,317
8 Claims. (Cl. 253—39.15)

This invention relates generally to a bladed rotor having blades with dual airfoils and more specifically to a bladed rotor having blades with dual airfoils which is particularly suited for use as a turbine rotor-aft fan for a lift engine.

There is presently considerable interest in the type of VTOL aircraft utilizing lift engines for take-off and landing. Since these engines operate only for short durations, i.e. during take-off and landing and comprise dead weight during normal forward flight, lightness of the lift engine is of prime importance. Experience has shown that a desirable type of lift engine is one having an aft fan directly connected to the power turbine. A dual airfoil bladed rotor provides such a structure.

In keeping with the overall design criterion for the lift engine of lightness, it is therefore an object of the present invention to provide a dual airfoil bladed rotor having the lightest possible weight while maintaining a reasonable standard of durability.

Another object is to provide the dual airfoil bladed rotor with a shroud to separate the airfoils into two distinct concentric stages and to dampen blade vibration without adding undue weight to the assembly.

Another object is to provide a dual airfoil bladed rotor with one stage air-cooled to permits its use in higher temperature gas streams without adding additional weight to the structure.

With these and other objects in view as will hereinafter more fully appear and which will be more particularly pointed out in the appended claims, reference is now made to the following description taken in conjunction with the accompanying drawings in which:

FIGURE 1 is a frontal view of the turbine-aft fan section of a lift engine having a dual airfoil bladed rotor in accordance with the present invention.

FIGURE 2 is a section taken substantially along the line 2—2 of FIGURE 1.

FIGURE 3 is an enlarged view of a portion of FIGURE 2 with parts cut away showing the junction of shroud segment and the dual airfoils which form a part of the present invention.

Figure 4:
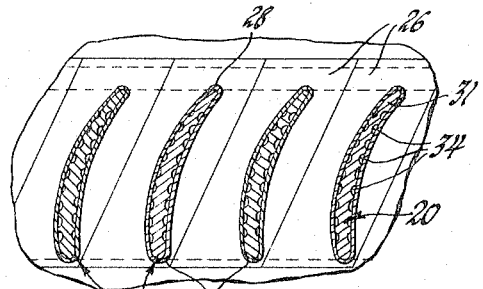
FIGURE 4 is a plan view section taken substantially along the line 4—4 of FIGURE 2.
Figure 5:
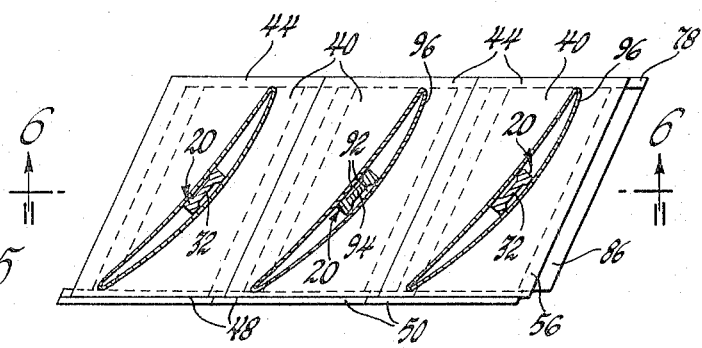
FIGURE 5 is a plan view section taken substantially along the line 5—5 of FIGURE 3.

Referring now to FIGURE 1, a portion of a rotor indicated generally at 12 comprises a rotor wheel 14 rotatably mounted within a housing 16. The rotor wheel 14 carries a plurality of blades 18 in axial slots 24 spaced around the circumference of the wheel 14. The blades 18 have shroud segments 38 incorporated therein which abut to form a shroud 98 which separates the blades into distinctive concentric stages.

In FIGURE 2, a single blade 18 is shown in greater detail. The blade 18 comprises a central spar 20 having a conventional dovetail root 22 at its inner end shaped to fit the slots 24 of the rotor wheel 14. Spaced radially outwardly from the root 22 by stalk 23 is a platform 26 which abuts adjacent platforms to form an inner supply plenum 27. The central spar 20 tapers from the platform 26 to a portion 32 of uniform I-shaped cross section. A sheet metal wrapper 28 embraces the tapered portion 31 of the spar and part of the portion 32 and is welded or brazed to the platform to form a first airfoil 30. Airfoils 30 are turbine blades. Inlets 36 provided in the stalk 23 of spar 20 communicate with passages 34 (FIG. 4) formed by fluting the faces of the tapered portion 31 of the spar which contact the inner surface of the sheet metal wrapper 28. Referring back to FIGURE 2, it can be seen that the passages 34 in turn communicate with the space 35 between the sheet metal wrapper 28 and the spar 20 to establish a flow path from plenum 27 to cool the turbine blades.

Figure 7:
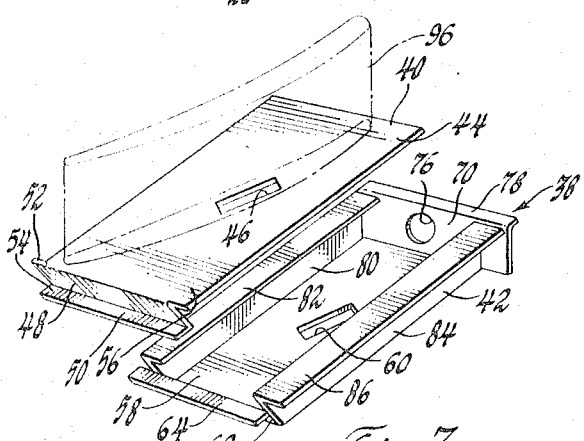
FIGURE 7 is an exploded perspective view of the shroud segment shown in FIGURE 3.

Attached to the outer end of the sheet metal wrapper 28 is a shroud segment on each blade shown generally at 38 in FIGURE 2 and in detail in FIGURES 3 and 7.

Referring to FIGURE 7, the shroud segment 38 comprises outer and inner sheet metal pieces 40 and 42, respectively. The outer sheet metal piece 40 consists of an outer planar surface 44 having a central aperture 46 and an integral front face 48 which terminates in an axially extending sealing lip 50. The front face 48 and sealing lip 50 are circumferentially offset with respect to surface 44.

The inner sheet metal piece 42 comprises an inner planar wall 58 having a central aperture 60 aligned with the aperture 46. An integral front face 62 on wall 58 terminates in an axially extending sealing lip 64 and is likewise circumferentially offset with respect to wall 58 so as to align with face 48 and sealing lip 50. In addition, the inner sheet metal piece 42 is provided with a flanged rear face 70 and side walls 80 and 84. The rear face 70 with its central aperture 76 is offset with respect to planar wall 58 in the opposite direction to the offset front face 62. Flange 78 on rear face 70 extends rearwardly while flanges 82 and 86 on sides 80 and 84, respectively, both extend toward the right.

In incorporating the shroud segment 38 into the blade 18, the inner piece 42 is first placed at the outer end of the sheet metal wrapper 28 with the channel portion 32 of spar 20 extending through aperture 60 in the planar wall 58. The inner surface of wall 58 is brazed or welded to the outer edge of the wrapper 28 at 59, and the spar 20 is secured in the aperture 60 with ports 92 being formed between the wall of the aperture 60 and the central web 94 of the I-beam spar 32. The outer piece 40 is then threaded onto spar 20 and mated with the lower piece 42 to form a closed hollow box 90. Axial sealing lips 50 and 64 are brazed or otherwise secured together and together with flanges 48 and 62 form a front face 88 adapted to form a labyrinth seal with suitable mating structure. The outer surfaces of flanges 78, 82, and 86 are likewise suitably secured to the inner surface of planar wall 44 on outer piece 40 to complete the closing of the box as can best be seen in FIGURE 6.

Referring to FIGURE 3, the aperture 76 forms an outlet for the interior of the hollow box 90 which communicates with the space 35 between spar 20 and the sheet metal wrapper 28 via ports 92. Thus, the path for the flow of cooling air through the turbine blade from plenum 27 to outlet aperture 76 is completed. In its contemplated application, air cooling of airfoil 30 is necessary so that its light weight construction can endure the thermal stresses produced by the hot gas stream in which the turbine is disposed. Air cooling of the blades, however, may or may not be necessary depending upon the use to which rotor of the invention is put. If the inner airfoil 30 is utilized as a turbine blade subjected to temperatures where air cooling is necessary, the path for flow of cooling air through the blade is then available. In other uses, cooling may not be needed and the inlets 36 and aperture outlet 76 may be omitted.

With the shroud segment 38 secured to the outer end of the sheet metal wrapper 28 and the spar 20 extending therethrough and secured in apertures 46 and 60 by brazing or welding, a second sheet metal wrapper 96 is placed over the outer end of spar 20 and welded or brazed to the outer surface of the shroud segment 38 to form a second airfoil 31 which is a fan.

When the blades 18 are assembled to the wheel 14, a shroud 98 is formed by the shroud segments 38 on each blade 18 abutting the shroud segments of the blades on either side of it. The shroud separates the blade 18 into two distinct concentric stages: an inner stage made up of turbine airfoils 30 and an outer stage comprising fan airfoils 31.

Figure 6:
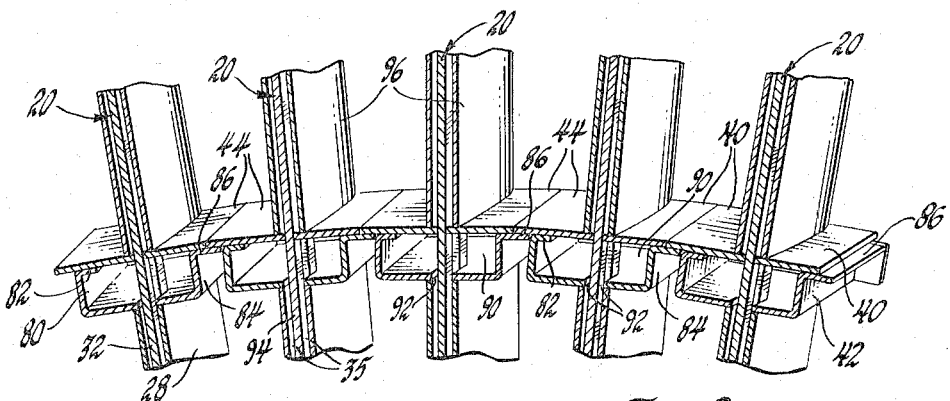
FIGURE 6 is a section taken substantially along the line 6—6 of FIGURE 5.

In abutting an adjacent shroud segment, the closed hollow box 90 of each segment 38 will be spaced from the box to its right by flange 86 on side 84 which extends circumferentially to abut side 80 of an adjacent shroud segment (see FIGURE 6). The outer planar wall 44 of the adjacent shroud segment extends circumferentially toward the left overlying the flange 86 and abutting the offset portion 56 on the planar wall 44 of the first segment 38. This provides a double wall between adjacent boxes 90 with the breaks in the walls offset to reduce air flow radially therethrough as can easily be seen in FIGURE 6. The segments merely abut and are not connected, to allow radial growth of the blades without transfer of load through the segments 38. The upper surface of flange 86 frictionally engages the lower surface of an adjacent planar wall 44. This frictional engagement tends to dissipate energy when one blade moves with respect to another blade and will thus aid in damping single blade vibrations. The offset front faces 88 and rear faces 70 mate to form contiguous front and rear annular walls. The breaks in the annular walls occur in the spaces between boxes 90 with the front and rear breaks on the opposite side of the spaces to reduce air leakage in the axial direction.

With the blades thus assembled, it can be appreciated that the shroud segment 38 provides a number of useful functions. They abut to form a shroud separating the airfoils into distinct stages and to minimize stress transfer through the segments. They abut in a manner to prevent air leakage and provide single blade vibration damping. The segments 38 also include closed box portions 90 which form part of the air cooling path for the airfoils 30. In addition, the sheet metal segments 38 together with the wrappers 28 and 96 and stalks 20 form very light blades which when assembled to wheel 14 form a very light rotor. Thus it can be seen that I have provided a dual airfoil bladed rotor having the lightest possible weight with features designed to maintain reasonable standards of durability.

It should be understood, of course, that while the invention has been shown in conjunction with a lift engine, other uses are contemplated and that many various modifications and changes may be made to the specific embodiment disclosed without departing from the spirit and scope of the invention as defined in the appended claims.

I claim:
1. A rotor comprising:
   a rotor wheel,
   a plurality of dual airfoils extending radially from said rotor wheel, each of said airfoils including:
   a central spar secured to said wheel at its inner end,
   a platform adjacent the inner end of said spar adapted to abut platforms on adjacent spars,
   a first sheet metal wrapper embracing said spar and the outer surface of said platform to form a first blade,
   a shroud segment including:
   a closed, hollow, two-piece sheet metal box with front and rear faces, sides and inner and outer walls secured to the outer end of said first blade with said spar extending through said inner and outer walls,
   means extending circumferentially from said box adapted to abut adjacent boxes to space said boxes circumferentially,
   said front and rear faces having integral extensions adapted to abut adjacent front and rear faces respectively to form contiguous front and rear annular walls whereby said segments form a shroud connecting the tips of said first blades,
   an axially extending sealing lip on said front annular wall,
   a second sheet metal wrapper secured to said outer wall of said shroud segment and said spar to form a second blade,
   inlet means in said spar inwardly from said platform,
   an outlet in said box, and
   conduit means in said first blade and said box extending between said inlet means and said outlet whereby a path for the flow of cooling air through said first blade is established.

2. A rotor comprising:
   a rotor wheel,
   a plurality of dual airfoils extending radially from said rotor wheel, each of said airfoils including:
   a central spar secured to said wheel at its inner end,
   a platform adjacent the inner end of said spar,
   a first sheet metal wrapper embracing said spar secured to the outer surface of said platform to form a first blade,
   a shroud segment including a closed hollow two-piece sheet metal box with front and rear faces, sides and inner and outer walls secured to the outer end of said first blade with said spar extending through said inner and outer walls,
   means extending circumferentially from adjacent boxes which overlap and abut to space said adjacent boxes circumferentially,
   an integral extension on each of said front faces abutting an adjacent front face to form a contiguous annular front wall,
   an integral extension on each of said rear faces abutting an adjacent rear face to form a contiguous annular rear wall whereby said segments form a shroud connecting the tips of said first blades,
   a second sheet metal wrapper secured to said outer wall and said spar to form a second blade,
   inlet means in said spar radially inwardly from said platform,
   an outlet in said rear face of said box, and
   conduit means in said first blade and said box extending from said inlet means to said outlet whereby a path for the flow of cooling air through said first blade is established.

3. A rotor as described in claim 2 wherein said integral extension on said first face extends circumferentially in one direction to abut an adjacent front face and said integral extension on said rear face extends circumferentially in an opposite direction to abut an adjacent rear face.

4. A rotor comprising:
   a rotor wheel,
   a plurality of dual airfoils extending radially from said rotor wheel, each of said airfoils including:
   a central spar secured to said wheel at its inner end,
   a platform on said spar adjacent its inner end,
   a first sheet metal wrapper embracing said spar and secured to the outer surface of said platform to form a first blade,
   a shroud segment including a closed, hollow, two-piece sheet metal box with front and rear faces, sides and inner and outer walls secured to the outer end of said first blade with said spar extending through said inner and outer walls, means extending circumferentially from adjacent boxes which overlap and abut to space said adjacent boxes circumferentially,
an integral extension on each of said front faces abutting an adjacent front face to form a contiguous annular front wall,
an integral extension on each of said rear faces abutting an adjacent rear face to form a contiguous annular rear wall whereby said segments form a shroud connecting the tips of said first blades, and
a second sheet metal wrapper secured to said outer wall and said spar to form a second blade.

5. A rotor comprising:
a rotor wheel,
a plurality of dual airfoils extending radially from said rotor wheel, each of said airfoils including:
a central spar secured to said wheel at its inner end,
a platform on said spar adjacent its inner end,
a first hollow blade embracing said spar and secured to said platform,
a shroud segment including a closed, hollow box secured to the outer end of said first blade with said spar extending radially therethrough,
means extending circumferentially from said box to space said box circumferentially from adjacent boxes and to form contiguous front and rear annular walls whereby said segments form a shroud connecting the tips of said first hollow blades and a second hollow blade embracing said spar atop said shroud segments, said second blade being secured to said spar and said shroud segment.

6. A rotor comprising:
a rotor wheel,
a plurality of dual airfoils extending radially from said rotor wheel, each of said airfoils including:
a central spar secured to said wheel at its inner end,
a platform on said spar adjacent its inner end,
a first hollow blade embracing said spar and secured to said platform,
a shroud segment secured to the outer end of said first blade with said spar extending radially therethrough, said shroud segment being a closed, hollow box,
means extending circumferentially from adjacent boxes and to form contiguous front and rear annular walls whereby said segments form a shroud connecting the tips of said first hollow blades,
a second hollow blade embracing said spar atop said shroud segment,
inlet means in said spar radially inwardly from said platform,
an outlet in said box, and
conduit means in said first blade and said box extending from said inlet means to said outlet whereby a path for the flow of cooling air through said first blade is established.

7. A rotor comprising:
a rotor wheel,
a plurality of dual airfoils extending radially from said rotor wheel, each of said airfoils including:
a central spar secured to said wheel at its inner end,
a platform on said spar spaced from said inner end,
a first hollow blade embracing said spar and secured to said platform,
a closed, hollow shroud segment secured to the outer end of said first blade with said spar extending therethrough, said segments abutting adjacent segments to form a shroud connecting the tips of said first blades,
a second hollow blade embracing said spar atop said shroud segment,
inlet means in said spar radially inwardly from said platform,
an outlet in said segment, and
conduit means in said first blade and said segments extending from said inlet means to said outlet whereby a path for the flow of cooling air through said first blade is established.

8. A dual airfoil comprising:
a central spar adapted to be secured to a rotor wheel at its inner end,
a platform adjacent the inner end of said spar,
a first sheet metal wrapper embracing said spar and the outer surface of said platform to form a first blade,
a shroud segment including:
a closed, hollow sheet metal box with inner and outer walls secured to the outer end of said first blade with said spar extending through said inner and outer walls,
a second sheet metal wrapper secured to said outer wall and said spar to form a second blade,
inlet means in said spar inwardly from said platform,
an outlet in said box, and
conduit means in said first blade and said box extending between said inlet means and said outlet whereby a path for the flow of cooling air through said first blade is established.

References Cited by the Examiner
UNITED STATES PATENTS 2,961,150  11/1960  Pirtle.
2,999,631  9/1961  Wollmershauser.

FOREIGN PATENTS 679,467  9/1952  Great Britain.

EDGAR W. GEOGHEGAN, *Primary Examiner.*

EVERETTE A. POWELL, JR., *Examiner.*